(12) United States Patent
Su et al.

(10) Patent No.: US 12,540,378 B2
(45) Date of Patent: Feb. 3, 2026

(54) EVAPORATOR

(71) Applicants: York (Wuxi) Air Conditioning and Refrigeration Co., Ltd., Wuxi (CN); Johnson Controls Tyco IP Holdings LLP, Milwaukee, WI (US)

(72) Inventors: Xiuping Su, Wuxi (CN); Yong Wang, Wuxi (CN)

(73) Assignees: York (Wuxi) Air Conditioning and Refrigeration Co., Ltd., Wuxi (CN); Tyco Fire & Security GmbH, Neuhausen am Rheinfall (CH)

( * ) Notice: Subject to any disclaimer, the term of this patent is extended or adjusted under 35 U.S.C. 154(b) by 131 days.

(21) Appl. No.: 18/272,037

(22) PCT Filed: Jan. 6, 2022

(86) PCT No.: PCT/CN2022/070481
§ 371 (c)(1),
(2) Date: Jul. 12, 2023

(87) PCT Pub. No.: WO2022/152033
PCT Pub. Date: Jul. 21, 2022

(65) Prior Publication Data
US 2024/0085069 A1    Mar. 14, 2024

(30) Foreign Application Priority Data
Jan. 13, 2021   (CN) .......................... 202110040801.0

(51) Int. Cl.
*C22C 23/02*   (2006.01)
*B21C 23/20*   (2006.01)
(Continued)

(52) U.S. Cl.
CPC ............ *C22C 23/02* (2013.01); *B21C 23/205* (2013.01); *B22D 11/001* (2013.01); *C22C 1/02* (2013.01);
(Continued)

(58) Field of Classification Search
CPC ........ F28D 7/1607; F28D 3/02; F28D 7/1638; F28F 25/04; F28F 2009/222;
(Continued)

(56) References Cited

U.S. PATENT DOCUMENTS 10,132,537 B1 *  11/2018  Stamp .................. F28F 9/0273
2008/0073059 A1    3/2008  Weel
(Continued)

FOREIGN PATENT DOCUMENTS

CN      104457040 A      3/2015
CN      104748448 A      7/2015
(Continued)

OTHER PUBLICATIONS

Pdf is translation of foreign reference CN 106123400 A (Year: 2016).*
(Continued)

*Primary Examiner* — Len Tran
*Assistant Examiner* — Kamran Tavakoldavani
(74) *Attorney, Agent, or Firm* — Fletcher Yoder, P.C.

(57) ABSTRACT

An evaporator includes a housing, a first heat exchange tube set, a second heat exchange tube set, a first side heat exchange tube baffle device, a second side heat exchange tube baffle device, and a redistribution device. The first heat exchange tube set is located above the second heat exchange tube set. The first side heat exchange tube baffle device and the second side heat exchange tube baffle device are arranged along the outer contours of the first heat exchange tube set and the second heat exchange tube set, so as to guide (Continued)

a refrigerant to flow from the first heat exchange tube set to the second heat exchange tube set. The redistribution device is disposed between the first heat exchange tube set and the second heat exchange tube set to evenly distribute the refrigerant to the second heat exchange tube set.

13 Claims, 11 Drawing Sheets

(51) Int. Cl.
*B22D 11/00* (2006.01)
*C22C 1/02* (2006.01)
*C22F 1/06* (2006.01)
*F25B 39/02* (2006.01)
*F28D 3/02* (2006.01)
*F28F 9/22* (2006.01)

(52) U.S. Cl.
CPC .............. *C22F 1/06* (2013.01); *F25B 39/028* (2013.01); *F28D 3/02* (2013.01); *F25B 2339/0242* (2013.01); *F25B 2500/09* (2013.01); *F28F 2009/222* (2013.01)

(58) Field of Classification Search
CPC .............................. F25B 39/028; F25B 39/02; F25B 2339/0242; F25B 2500/09
See application file for complete search history.

(56) References Cited

U.S. PATENT DOCUMENTS

2019/0033018 A1* 1/2019 Higashiiue ................ F28F 9/22
2020/0200478 A1 6/2020 Wilson et al.

FOREIGN PATENT DOCUMENTS

| CN | 104764258 A | 7/2015 | |
| CN | 105745508 A | 7/2016 | |
| CN | 106123400 A | * 11/2016 | ............ F25B 39/028 |
| CN | 109282531 A | 1/2019 | |
| CN | 109357441 A | 2/2019 | |
| CN | 111213022 A | 5/2020 | |
| JP | 2017190926 A | 10/2017 | |

OTHER PUBLICATIONS

PCT International Search Report for PCT Application No. PCT/CN2022/070481, mailed Mar. 10, 2022, 2 pgs.

* cited by examiner

EVAPORATOR

CROSS-REFERENCE TO RELATED APPLICATIONS

This application is a U.S. National Stage Application of PCT Application No. PCT/CN2022/070481, entitled "EVAPORATOR," filed Jan. 6, 2022, which claims priority to and the benefit of Chinese Patent Application No. 202110040801.0, filed Jan. 13, 2021, each of which is herein incorporated by reference in its entirety for all purposes.

TECHNICAL FIELD

The present application relates to an evaporator, in particular to an evaporator with high heat exchange efficiency.

BACKGROUND ART

A traditional refrigeration system has an evaporator, a condenser, a throttling device, and a compressor. When passing through the evaporator, a low-temperature refrigerant liquid exchanges heat with the outside to absorb the heat from the outside, thereby reducing the temperature of the outside and achieving a refrigerating effect; the outside may be air or cooling water. After heat exchange, the refrigerant liquid is vaporized into a gaseous refrigerant to enter the compressor. The heat exchange efficiency of the evaporator is affected by many factors.

SUMMARY OF THE INVENTION

The present application provides an evaporator, and the heat exchange efficiency of the evaporate is higher.

The evaporator in the present application comprises: a housing, a first heat exchange tube set, a second heat exchange tube set, a first side heat exchange tube baffle device, a second side heat exchange tube baffle device, and a redistribution device; the housing has a cavity, and the cavity has a length direction, a width direction, and a height direction; heat exchange tubes in the first heat exchange tube set and the second heat exchange tube set extend along the length direction of the cavity, and are arranged along the width direction and the height direction of the cavity and the first heat exchange tube set is located above the second heat exchange tube set, wherein in the width direction of the cavity, the number of columns of the first heat exchange tube set is greater than that of the second heat exchange tube set; the first side heat exchange tube baffle device and the second side heat exchange tube baffle device are disposed on two opposite sides of the first heat exchange tube set and the second heat exchange tube set in the width direction of the cavity, respectively, and are arranged along outer contours of the first heat exchange tube set and the second heat exchange tube set; the redistribution device is disposed between the first heat exchange tube set and the second heat exchange tube set, and two ends of the redistribution device in the width direction of the cavity are respectively connected to the first side heat exchange tube baffle device and the second side heat exchange tube baffle device, wherein the redistribution device extends along the length direction of the cavity to cover a top of the second heat exchange tube set, and has a certain distance from a lower part of the first heat exchange tube set, the redistribution device is provided with a plurality of rows of holes, each row of holes of the plurality of rows of holes is arranged along an extending direction of the heat exchange tubes, and each row of holes of the plurality of rows of holes is aligned with the corresponding column of heat exchange tubes in the second heat exchange tube set.

For the evaporator as described above, the first heat exchange tube set and the second heat exchange tube set are arranged symmetrically with respect to a central interface of the cavity extending along the height direction, respectively.

For the evaporator as described above, a width of the first heat exchange tube set is identical to that of the second heat exchange tube set.

For the evaporator as described above, the first heat exchange tube set has an upper part of the first heat exchange tube set and a lower part of the first heat exchange tube set, and in the width direction of the cavity, a width of the upper part of the first heat exchange tube set is greater than the width of the second heat exchange tube set.

For the evaporator as described above, a width of the lower part of the first heat exchange tube set gradually decreases from top to bottom, a width of the top of the lower part of the first heat exchange tube set is identical to the width of the upper part of the first heat exchange tube set, and a width of the bottom of the lower part of the first heat exchange tube set is identical to the width of the second heat exchange tube set.

For the evaporator as described above, in the width direction of the cavity, sizes of a plurality of holes in the redistribution device gradually decrease from a middle to two sides of the redistribution device.

The above evaporator further comprises: a third heat exchange tube set, wherein the third heat exchange tube set is located at a bottom of the cavity and below the second heat exchange tube set, and the third heat exchange tube set has a certain distance from the second heat exchange tube set to form a circulation space, so that a gaseous refrigerant flowing out from the second heat exchange tube set can flow to a refrigerant outlet disposed on the housing through the circulation space.

For the evaporator as described above, the first side heat exchange tube baffle device and the second side heat exchange tube baffle device comprise at least one baffle exhaust channel, respectively, and in the height direction of the cavity, the baffle exhaust channel is located above the second heat exchange tube set, and the at least one baffle exhaust channel is configured to discharge the gaseous refrigerant in the first heat exchange tube set.

For the evaporator as described above, the first side heat exchange tube baffle device and the second side heat exchange tube baffle device comprise a lower section of a first side upper baffle and a lower section of a second side upper baffle, respectively, the lower section of the first side upper baffle and the lower section of the second side upper baffle are disposed on two sides of the lower part of the first heat exchange tube set; the lower section of the first side upper baffle and the lower section of the second side upper baffle are provided with a plurality of exhaust holes, respectively, each of the plurality of exhaust holes forms a baffle exhaust channel, the plurality of exhaust holes are arranged along the length direction of the cavity, and each of the plurality of exhaust holes forms a long strip shape in a direction from the upper part of the first heat exchange tube set to the second heat exchange tube set.

For the evaporator as described above, the first heat exchange tube set has a heat exchange tube exhaust channel, the heat exchange tube exhaust channel is formed between the heat exchange tubes of the first heat exchange tube set, the heat exchange tube exhaust channel extends inward and upward from the two sides of the lower part of the first heat exchange tube set, and on a section plane perpendicular to the length direction of the cavity, a width of the heat exchange tube exhaust channel is greater than a gap between the heat exchange tubes above the heat exchange tube exhaust channel.

For the evaporator as described above, each of the first side heat exchange tube baffle device and the second side heat exchange tube baffle device comprises an upper baffle and a lower baffle, the upper baffle is disposed on one side of the first heat exchange tube set, the lower baffle comprises a main body section and an extension section, the main body section is disposed on one side of the second heat exchange tube set, the extension section extends upward from the main body section, the extension section is at least partially overlapped with the upper baffle, and the baffle exhaust channel is formed between the upper baffle and the extension section.

For the evaporator as described above, each of the first side heat exchange tube baffle device and the second side heat exchange tube baffle device further comprises at least one transverse baffle, the at least one transverse baffle is disposed in the baffle exhaust channel, the at least one transverse baffle extends transversely to the extension section of the lower baffle, and the at least one transverse baffle is provided with a plurality of openings to allow the gaseous refrigerant to pass through.

For the evaporator as described above, the number of the at least one transverse baffles is two, the at least one transverse baffle is arranged along an extending direction of the baffle exhaust channel, and the openings in the two transverse baffles are arranged in a staggered manner.

The falling film heat exchange tube set of the evaporator in the present application has two parts with different numbers of columns, with the number of columns of an upper heat exchange tube set greater than that of a lower heat exchange tube set. A redistribution device is provided between the two parts of heat exchange tube sets, so that the heat exchange tubes of the lower heat exchange tube set can obtain a sufficient flow of a liquid refrigerant. The setting of the falling film heat exchange tube set in the present application can improve the heat exchange efficiency of the evaporator.

DETAILED DESCRIPTION OF EMBODIMENTS

Various embodiments of the present application will be described below with reference to the accompanying drawings, which constitute a part of the specification. It should be understood that although directional terms, such as "front", "rear", "upper", "lower", "left", "right", "inner", "outer", "top", "bottom", "obverse", "reverse", "proximal", "distal", "transverse", "longitudinal", are used in the present application to describe various example structural parts and elements of the present application, these terms used herein are for convenience of illustration only and are determined based on the exemplary orientations shown in the accompanying drawings. Since the embodiments disclosed in the present application may be disposed in different directions, these directional terms are for illustration only and should not be regarded as limiting.

Ordinal numerals such as "first" and "second" used in the present application are only used for distinction and identification and do not have any other meaning, and unless specifically indicated, they do not denote a specific order, nor do they have a specific relevance. For example, a term "first component" by itself does not imply the presence of a "second component", nor does a term "second component" itself imply the presence of a "first component".

Figure 1:
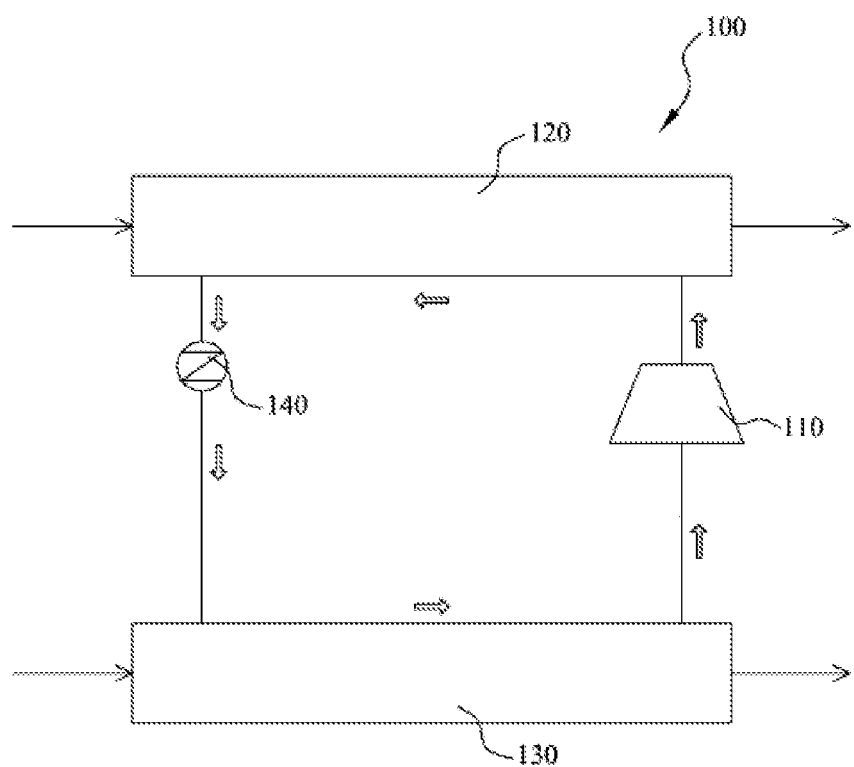
FIG. 1 is a schematic block diagram of a refrigeration system 100.

FIG. 1 is a schematic block diagram of a refrigeration system 100. As shown in FIG. 1, the refrigeration system 100 comprises a compressor 110, a condenser 120, a throttling device 140, and an evaporator 130, which are connected by pipes to form a refrigerant circulation loop, and the loop is filled with a refrigerant in it. As shown by the arrow direction in FIG. 1, the refrigerant flows through the compressor 110, the condenser 120, the throttling device 140 and the evaporator 130 in sequence, and enters the compressor 110 again. In a refrigeration process, the throttling device 140 throttles a high-pressure liquid refrigerant from the condenser 120 to reduce its pressure; the low-pressure refrigerant exchanges heat with an object to be cooled in the evaporator 130, and absorbs the heat of the object to be cooled for vaporization; refrigerant vapor generated by vaporization is sucked by the compressor 110 and discharged at high pressure after being compressed; a high-temperature and high-pressure gaseous refrigerant discharged from the compressor 110 performs heat exchange with an ambient medium in the condenser 120 to release heat and be condensed into a liquid refrigerant; and the high-temperature liquid refrigerant flows through the throttling device 140 again to be depressurized. With such repeated circulation, a continuous refrigeration effect is produced.

Figure 2:
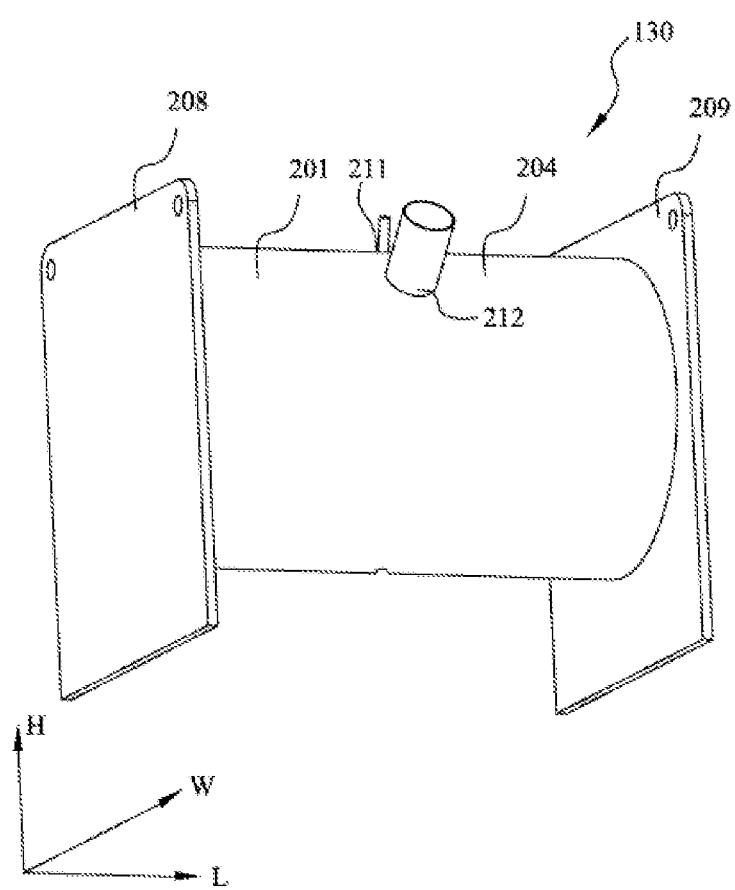
FIG. 2 is a stereogram of a first embodiment of the evaporator 130 in FIG. 1.

FIG. 2 is a stereogram of a first embodiment of the evaporator 130 in FIG. 1; as shown in FIG. 2, the evaporator 130 has a housing 201, the housing 201 comprises a cylindrical body 204 and a pair of tube plates 208 and 209, wherein the cylindrical body 204 is cylinder-shaped with openings at two ends, and the pair of tube plates 208 and 209 are placed at the two ends of the cylindrical body 204, respectively, to seal the openings at the two ends of the cylindrical body 204. The cylindrical body 204 and the pair of tube plates 208 and 209 enclose a cavity 305 (see FIG. 3), and the cavity 305 is used for accommodating heat exchange tubes. Referring to the position shown in FIG. 2, the evaporator 130 has a height direction H, a length direction L, and a width direction W, and the height direction, length direction and width direction of the cavity 305 are consistent with the directions of the evaporator 130. The cylindrical body 204 is provided with a refrigerant inlet 211 and a refrigerant outlet 212, wherein the refrigerant inlet 211 and the refrigerant outlet 212 are both located at the upper part of the evaporator 130 in the height direction. A liquid refrigerant or gas-liquid mixed refrigerant in the refrigeration system 100 enters the evaporator 130 from the refrigerant inlet 211, becomes a gaseous refrigerant after absorbing heat in the evaporator 130 and gets discharged from the refrigerant outlet 212.

Figure 3:
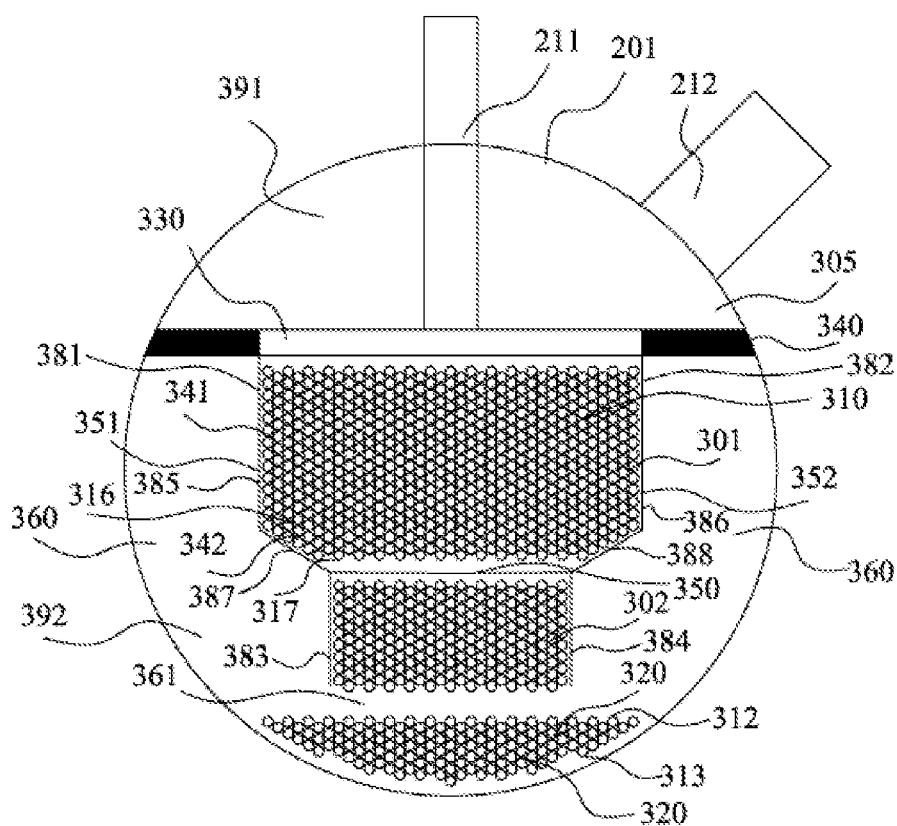
FIG. 3 is a schematic diagram of a radial section of the evaporator in FIG. 2.

FIG. 3 is a schematic diagram of a radial section of the evaporator in FIG. 2; as shown in FIG. 3, a cavity 305 is formed inside the housing 201, and a falling film heat exchange tube set 310, a flooded heat exchange tube set 320, a main distribution device 330, a mist eliminator 340, a redistribution device 350, a first side heat exchange tube baffle device 351 and a second side heat exchange tube baffle device 352 are provided in the cavity 305. As shown in conjunction with FIG. 2 and FIG. 3, both the refrigerant inlet 211 and the refrigerant outlet 212 are above the housing 201. Among them, the refrigerant inlet 211 is located at a middle part of the evaporator 130 in the length direction and the width direction, so as to facilitate even distribution of the refrigerant. The refrigerant outlet 212 and the refrigerant inlet 211 are arranged in a staggered manner in a radial direction. The main distribution device 330 is disposed above the falling film heat exchange tube set 310 and communicated with the refrigerant inlet 211, so as to send the refrigerant received from the refrigerant inlet 211 into the falling film heat exchange tube set 310 after distribute it evenly. The mist eliminator 340 extends outward from an edge of the main distribution device 330 until being connected to an inner wall of the housing 201. The first side heat exchange tube baffle device 351 and the second side heat exchange tube baffle device 352 are disposed on two sides of the falling film heat exchange tube set 310, respectively. The flooded heat exchange tube set 320 is disposed at a bottom of the cavity 305 and has a certain distance from a bottom of the falling film heat exchange tube set 310. The redistribution device 350 is disposed in the falling film heat exchange tube set 310.

The falling film heat exchange tube set 310 and the flooded heat exchange tube set 320 are heat exchange tube bundles formed from a plurality of heat exchange tubes arranged in sequence, respectively. Each heat exchange tube in the heat exchange tube bundle extends along the length direction L of the cavity 305. A fluid channel is formed inside each heat exchange tube for circulating water or other mediums. A gap between each heat exchange tube and the adjacent heat exchange tube forms a refrigerant channel for circulating the refrigerant. The medium in the fluid channel exchanges heat with the refrigerant in the refrigerant channel through a tube wall of the heat exchange tube. The flooded heat exchange tube set 320 is arranged upwardly from the inner wall of a bottom of the housing 201 of the cavity, and the flooded heat exchange tube set 320 has a top 312 and a bottom 313. The bottom 313 is arranged substantially adjacent to and along the inner wall of the housing 201, and a height of the top 312 is substantially the same. Viewed from a radial section of the evaporator 130, a contour of the bottom 313 of the flooded heat exchange tube set 320 is substantially arc-shaped, the contour of the top 312 is substantially a horizontal straight line, and two ends of the bottom 313 are connected to those of the top 312.

The falling film heat exchange tube set 310 comprises a first heat exchange tube set 301 and a second heat exchange tube set 302, wherein the first heat exchange tube set 301 is disposed at the upper part of the second heat exchange tube set 302. In the width direction of the cavity 305, the second heat exchange tube set 302 is disposed above the flooded heat exchange tube set 320, and has a certain distance from the flooded heat exchange tube set 320 to form a circulation space 361, so that the gaseous refrigerant can easily pass through the circulation space 361. In the present application, the flooded heat exchange tube set is a third heat exchange tube set. The heat exchange tubes in the first heat exchange tube set 301 and the second heat exchange tube set 302 are evenly arranged in columns, and distances between each column of heat exchange tubes and the adjacent column of heat exchange tubes are equal. The number of columns of the heat exchange tubes in the first heat exchange tube set 301 is C1, and the number of columns of the heat exchange tubes in the second heat exchange tube set 302 is C2, wherein the number of columns C1 of the heat exchange tubes in the first heat exchange tube set 301 is greater than the number of columns C2 of the heat exchange tubes in the second heat exchange tube set 302. In the present embodiment, the distance between adjacent columns of the first heat exchange tube set 301 is equal to that of the second heat exchange tube set 302, so that in the width direction of the cavity 305, a maximum width of the first heat exchange tube set 301 is greater than that of the second heat exchange tube set 302. Among them, the first heat exchange tube set 301 comprises an upper part 341 of the first heat exchange tube set and a lower part 342 of the first heat exchange tube set. In the width direction of the cavity 305, the upper part 341 of the first heat exchange tube set and the second heat exchange tube set 302 are identical in width from top to bottom, respectively, and a width of the lower part 342 of the first heat exchange tube set gradually decreases from top to bottom. A width of a top 316 of the lower part 342 of the first heat exchange tube set is equal to a width of the upper part 341 of the first heat exchange tube set, and a width of a bottom 317 of the lower part 342 of the first heat exchange tube set is equal to a width of the second heat exchange tube set 302. In the width direction of the cavity 305, contours of an outer side of the upper part 341 of the first heat exchange tube set and an outer side of the second heat exchange tube set 302 are substantially planes extending along a vertical direction, and a contour of an outer side of the lower part 342 of the first heat exchange tube set forms a slope inclined inward from top to bottom.

In the width direction of the cavity 305, a first side heat exchange tube baffle device 351 and a second side heat exchange tube baffle device 352 are provided on two sides of the falling film heat exchange tube set 310, respectively, wherein the first side heat exchange tube baffle device 351 and the second side heat exchange tube baffle device 352 are adjacent to the two sides of the falling film heat exchange tube set 310 in the width direction. The first side heat exchange tube baffle device 351 and the second side heat exchange tube baffle device 352 are arranged along the outer contour of the falling film heat exchange tube set 310. The first side heat exchange tube baffle device 351 and the second side heat exchange tube baffle device 352 comprise a first side upper baffle 381 and a second side upper baffle 382 which are located on two sides of the first heat exchange tube set 301, and a first side lower baffle 383 and a second side lower baffle 384 which are located on two sides of the second heat exchange tube set 302, respectively. The first side upper baffle 381 comprises an upper section 385 of the first side upper baffle and a lower section 387 of the first side upper baffle, which are located on one side of the upper part 341 of the first heat exchange tube set, and the second side upper baffle 382 comprises an upper section 386 of the second side upper baffle and a lower section 388 of the second side upper baffle, which are located on the other side of the upper part 341 of the first heat exchange tube set. Consistent with the outer contour of the falling film heat exchange tube set 310, the upper section 385 of the first side upper baffle, the upper section 386 of the second side upper baffle, the first side lower baffle 383 and the second side lower baffle 384 extend along the height direction and the length direction of the cavity 305, respectively. The distance between the upper section 385 of the first side upper baffle and the upper section 386 of the second side upper baffle is greater than that between the first side lower baffle 383 and the second side lower baffle 384. The two ends of the lower section 387 of the first side upper baffle are connected to the upper section 385 of the first side upper baffle and the first side lower baffle 383, respectively, and the two ends of the lower section 388 of the second side upper baffle are connected to the upper section 386 of the second side upper baffle and the second side lower baffle 384, respectively, so that the lower section 387 of the first side upper baffle and the lower section 388 of the second side upper baffle are inclined toward each other from top to bottom.

Smaller gaps exist between the first side heat exchange tube baffle device 351 and the falling film heat exchange tube set 310 and between the second side heat exchange tube baffle device 352 and the falling film heat exchange tube set 310. There are gaps between the first side heat exchange tube baffle device 351 and the housing 201 and between the second side heat exchange tube baffle device 352 and the housing 201 to form a side circulation space 360. The side circulation space 360 is used for circulating the gaseous refrigerant. The first side heat exchange tube baffle device 351 and the second side heat exchange tube baffle device 352 are used for guiding the refrigerant to flow from the first heat exchange tube set 301 to the second heat exchange tube set 302 from top to bottom, so as to prevent the liquid refrigerant from entering the side circulation space 360.

The main distribution device 330 is disposed above the falling film heat exchange tube set 310, and the redistribution device 350 is disposed between the first heat exchange tube set 301 and the second heat exchange tube set 302. The main distribution device 330 and the redistribution device 350 evenly distribute the liquid refrigerant to each column of heat exchange tubes. The mist eliminator 340 extends from the edge of the outer side of the main distribution device 330 to be connected to the inner wall of the housing 201. The mist eliminator 340 and the main distribution device 330 thus divide the cavity 305 into an upper space 391 and a lower space 392. The mist eliminator 340 is a network structure with a plurality of holes, and the upper space 391 is in fluid communication with the lower space 392 through the holes in the mist eliminator 340. The refrigerant outlet 212 and the refrigerant inlet 211 are both disposed on the housing 201 at the upper space 391, and the refrigerant inlet 211 is communicated with the main distribution device 330.

Figure 4:
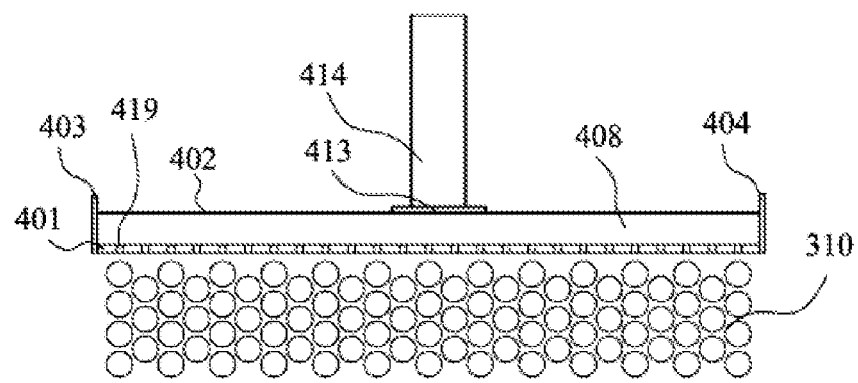
FIG. 4 is a schematic diagram of the main distribution device 330 and part of the falling film heat exchange tube set 310 in FIG. 3.

FIG. 4 is a schematic diagram of the main distribution device 330 and part of the falling film heat exchange tube set 310 in FIG. 3; as shown in FIG. 4, the main distribution device 330 comprises a bottom plate 401, a top plate 402, a pair of side plates 403 and 404, and a flow guide tube 414, wherein the bottom plate 401 and the top plate 402 extend along the width direction and the length direction of the cavity 305, and the pair of side plates 403 and 404 extends along the height direction and the length direction of the cavity 305. The bottom plate 401, the side plate 403, the top plate 402 and the side plate 404 are sequentially connected to enclose a chamber 408. The top plate 402 is provided with a flow guide tube hole 413, one end of the flow guide tube 414 is communicated with the flow guide tube hole 413, and the other end of the flow guide tube is communicated with the refrigerant inlet 211. The bottom plate 401 is provided with a plurality of rows of holes 419, each row of holes 419 includes a plurality of holes, and the holes in each row of holes 419 are arranged along an extending direction of the heat exchange tubes. The number of rows of the holes in the bottom plate 401 is equal to the number of columns of the first heat exchange tube set 301, and each row of holes 419 of the plurality of rows of holes 419 is aligned with the corresponding column of heat exchange tubes in the first heat exchange tube set 301. The liquid refrigerant entering the main distribution device 330 from the refrigerant inlet 211 flows along the length direction and the width direction of the cavity 305 so as to be evenly distributed on the bottom plate 401. The refrigerant in the main distribution device 330 flows through each row of holes 419 in the bottom plate to each corresponding column of heat exchange tubes in the first heat exchange tube set 301. The refrigerant is distributed by the main distribution device 330 which evenly distribute the liquid refrigerant entering from the refrigerant inlet 211 to each column of heat exchange tubes. In some embodiments of the present application, the number and area of the holes in the bottom plate 401 are configured to match the flow rate of the refrigerant entering the evaporator 130, so that the liquid level height of the refrigerant in the main distribution device 330 is maintained within a certain range.

Figure 5:
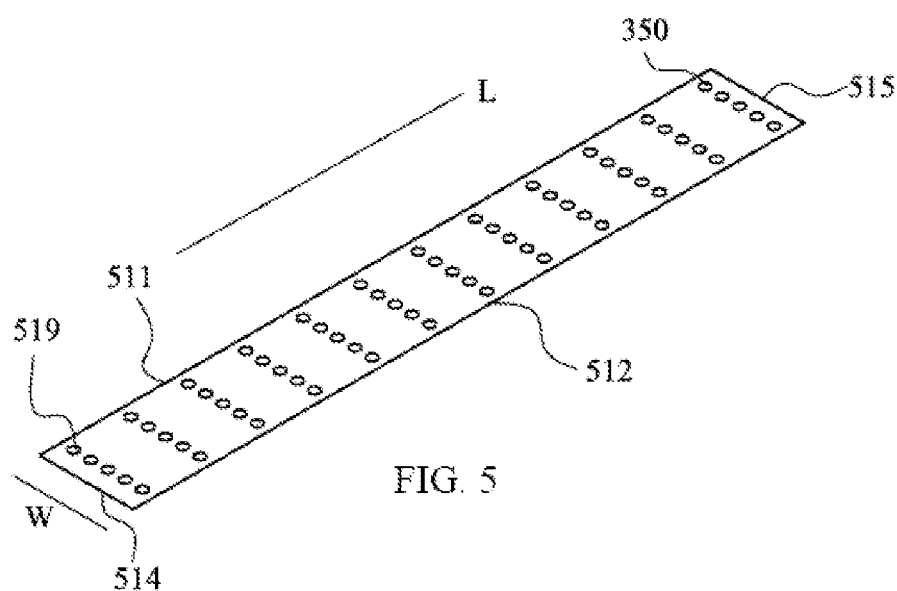
FIG. 5 is a stereogram of a first embodiment of the redistribution device 350 in FIG. 3.

FIG. 5 is a stereogram of a first embodiment of the redistribution device 350 in FIG. 3; as shown in FIG. 5, the redistribution device is a flat plate with a plurality of holes. Similar to the structure of the bottom plate 401 of the main distribution device 330 shown in FIG. 4, the redistribution device 350 is provided with a plurality of rows of holes 519, each row of holes 519 includes a plurality of holes, and the holes in each row of holes 519 are arranged along the length direction of the cavity 305, that is, the extending direction of the heat exchange tubes. The number of rows of holes in the main distribution device 330 is equal to the number of columns of the second heat exchange tube set 302 (FIG. 5 is a schematic view, showing only a part of the holes), and each row of holes 519 of the plurality of rows of holes 519 are aligned with the corresponding column of heat exchange tubes in the first heat exchange tube set 301. The two ends 511 and 512 of the redistribution device 350 in the width direction are connected to the first side heat exchange tube baffle device 351 and the second side heat exchange tube baffle device 352, respectively, and the two ends 514 and 515 of the redistribution device in the length direction are connected to the tube plate, respectively, so as to separate the first heat exchange tube set 301 and the second heat exchange tube set 302. The number and area of the holes in the redistribution device 350 are configured to be matched with the flow rate of the liquid refrigerant after heat exchange through the first heat exchange tube set 301, so that the refrigerant liquid level of the liquid refrigerant on the redistribution device 350 is maintained within a certain range.

In an application of the embodiment shown in FIG. 3, the ratio of the number of heat exchange tubes in the upper part 341 of the first heat exchange tube set to the number of heat exchange tubes in the lower part 342 of the first heat exchange tube set to the number of heat exchange tubes in the second heat exchange tube set is 492:184:310. The column number ratio of the upper part 341 of the first heat exchange tube set to the lower part 342 of the first heat exchange tube set is 37:23.

In the embodiment shown in FIG. 3, the liquid refrigerant enters the main distribution device 330 from the refrigerant inlet 211 and is evenly distributed by the main distribution device 330 before entering the first heat exchange tube set 301 for heat exchange. In the first heat exchange tube set 301, part of the liquid refrigerant undergoes heat exchange to become a gaseous refrigerant, and part of the liquid refrigerant continues to flow downward. Since part of the refrigerant in the first heat exchange tube set 301 becomes gaseous, the amount of the liquid refrigerant at the bottom of the first heat exchange tube set 301 is less than that of the liquid refrigerant at the top of the first heat exchange tube set 301, and the liquid refrigerant at the bottom of the heat exchange tube set 301 is redistributed by the redistribution device 350 before entering the second heat exchange tube set 302 for heat exchange. The second heat exchange tube set 302 continues to convert a part of the liquid refrigerant into a gaseous refrigerant, while the other part of the refrigerant is still in a liquid state, and the liquid refrigerant enters the flooded heat exchange tube set 320 to continue heat exchange. The liquid refrigerant in the falling film heat exchange tube set 310 flows from bottom to bottom, and is blocked by the first side heat exchange tube baffle device 351 and the second side heat exchange tube baffle device 352 from diffusing to the side circulation space 360. In the flooded heat exchange tube set, a part of the refrigerant is converted into a gaseous refrigerant. The gaseous refrigerant produced by the heat exchange between the falling film heat exchange tube set 310 and the flooded heat exchange tube set 320 flows through the circulation space 361, the side circulation space 360, the mist eliminator 340 and the upper space 391 in sequence before flowing out from the refrigerant outlet 212. The mist eliminator 340 is capable of removing small liquid droplets mixed in the gaseous refrigerant.

The gaseous refrigerant described herein refers to the fact that gas accounts for a vast majority of the refrigerant, and it is not excluded that the gaseous refrigerant contains a small amount of liquid droplets.

In the present application, the heat exchange tubes in the flooded heat exchange tube set 320 are submerged by a refrigerant liquid, and the height of the refrigerant liquid is substantially flush with that of the flooded heat exchange tube set 320 during the operation of the evaporator.

In the present application, the number of columns of the first heat exchange tube set 301 is matched with the flow of the liquid refrigerant distributed by the main distribution device 330, and the number of columns of the second heat exchange tube set 302 is matched with the flow of the liquid refrigerant distributed by the redistribution device 350. In the present application, the falling film heat exchange tube set 310 is provided with two sections with different numbers of columns, which is beneficial to improving heat exchange efficiency of the evaporator 130.

Figure 6:
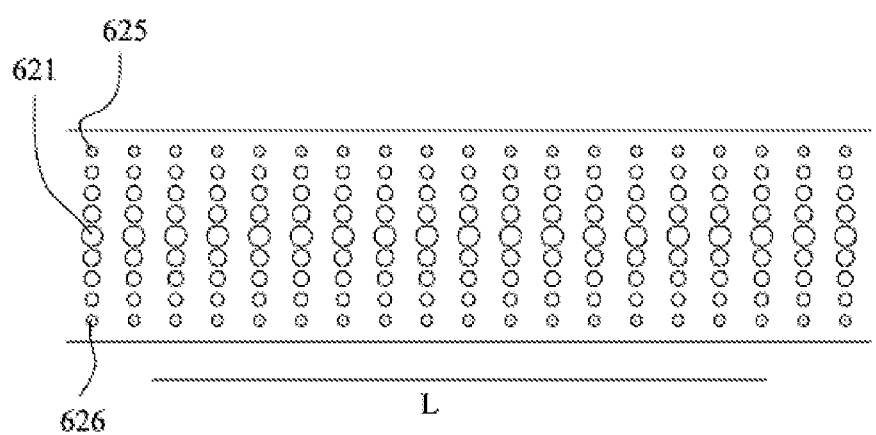
FIG. 6 is a top view of a second embodiment of the redistribution device 350 in FIG. 3.

FIG. 6 is a top view of a second embodiment of the redistribution device 350 of FIG. 3 which is similar to the embodiment shown in FIG. 5, except that the diameters of each row of holes in the redistribution device 350 are different. There are a plurality of rows of holes in the redistribution device 350 in the width direction, and each hole in each row of holes has the same diameter, but is different in diameter from the holes in other rows. Each hole in the row of holes 621 located in the middle in the width direction has the largest diameter, and each hole in the two rows of holes 625 and 626 located on two sides in the width direction has the smallest diameter. The diameter of each hole in each row of holes gradually decreases from the middle to the two sides in the width direction. The redistribution device 350 in FIG. 6 is also applicable to the embodiment shown in FIG. 3. In the embodiment shown in FIG. 3, the width of the lower part 342 of the first heat exchange tube set is gradually narrowed, two sides of the lower part 342 of the first heat exchange tube set are provided with the lower section 387 of the first side upper baffle and the lower section 388 of the second side upper baffle which are matched with the two sides in shape, and the lower section 387 of the first side upper baffle and the lower section 388 of the second side upper baffle are slopes inclined inward. Due to the guidance of the inclined lower section 387 of the first side upper baffle and lower section 388 of the second side upper baffle, the flow of the liquid refrigerant at two sides of the bottom of the lower part 342 of the first heat exchange tube set is greater than that of the liquid refrigerant in the middle of the bottom of the lower part 342 of the first heat exchange tube set. The redistribution device 350 as shown in FIG. 6 can enable the refrigerant to be relatively evenly distributed into the second heat exchange tube set 302.

In the embodiment shown in FIG. 3, the gaseous and liquid refrigerants generated in the first heat exchange tube set 301 both flow to the second heat exchange tube set 302. Among them, the liquid refrigerant generated in the first heat exchange tube set 301 can continue heat exchange in the second heat exchange tube set 302, while the gaseous refrigerant basically no longer participates in heat exchange. In some embodiments, discharging the gaseous refrigerant generated in the first heat exchange tube set 301 in time is beneficial to improving the heat exchange efficiency of the second heat exchange tube set 302.

Figure 7:
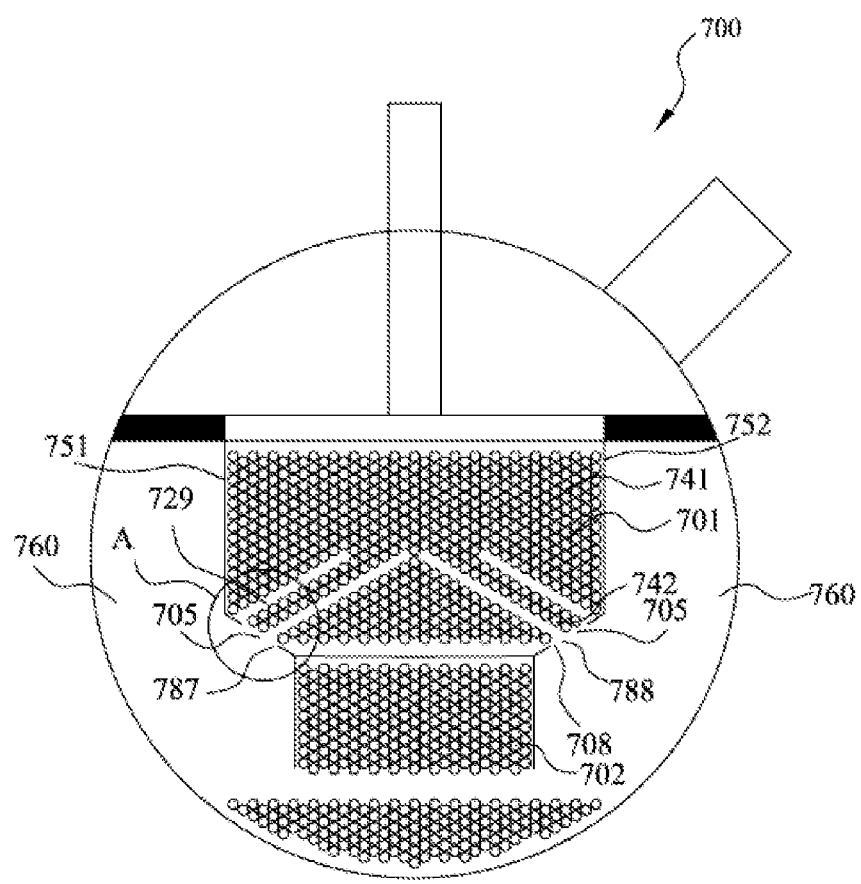
FIG. 7 is a schematic diagram of a radial section of a second embodiment of the evaporator in the present application.
Figure 8A:
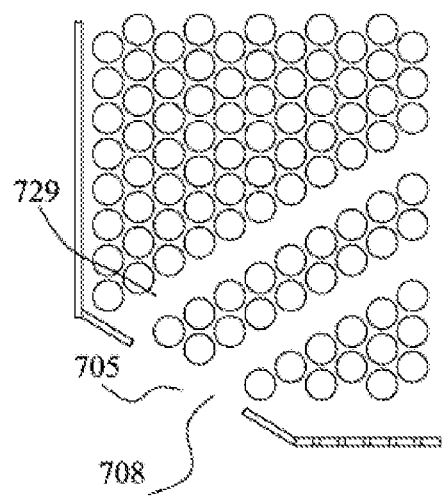
FIG. 8A is a partially enlarged view of a part A in FIG. 7A.
Figure 8B:
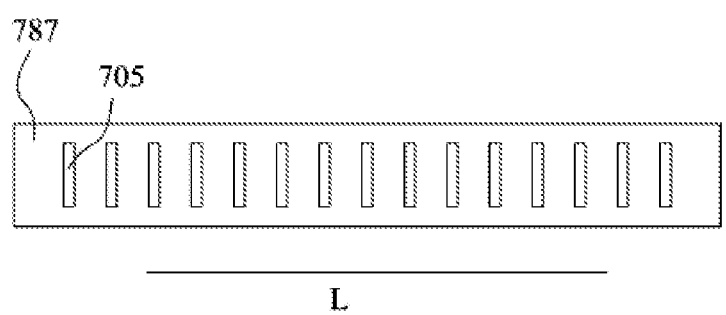
FIG. 8B is a top view of a lower section of the first side upper baffle in FIG. 7.

FIG. 7 is a schematic diagram of a radial section of a second embodiment of the evaporator in the present application, FIG. 8A is a partially enlarged view of a part A in FIG. 7A and FIG. 8B is a top view of a lower section of the first side upper baffle in FIG. 7. The embodiment is similar to the embodiment shown in FIG. 3, except that the first heat exchange tube set 301 in FIG. 7 has a heat exchange tube exhaust channel 729, and a baffle exhaust channel is provided in the first side heat exchange tube baffle device 351 and the second side heat exchange tube baffle device 352.

As shown in FIG. 7, FIG. 8A and FIG. 8B, the first side heat exchange tube baffle device 351 and the second side heat exchange tube baffle device 352 of the evaporator 700 comprise the lower section 787 of the first side upper baffle and the lower section 788 of the second side upper baffle located on two sides of the lower part 742 of the first heat exchange tube set, respectively. The lower section 787 of the first side upper baffle and the lower section 788 of the second side upper baffle are provided with a plurality of exhaust holes 705, respectively, and each exhaust hole 705 of the plurality of exhaust holes 705 forms a baffle exhaust channel 708. The baffle exhaust channel 708 can discharge the gaseous refrigerant generated in the first heat exchange tube set 701 in time.

As shown in FIG. 7 and FIG. 8B, the plurality of exhaust holes 705 are arranged along the length direction of the cavity 305, and each exhaust hole 705 of the plurality of exhaust holes 705 forms a long strip shape in a direction from the upper part 741 of the first heat exchange tube set to the second heat exchange tube set 302. The plurality of exhaust holes 705 in long strip shape are used for preventing excessive liquid refrigerant from flowing into the circulation space 760 from the exhaust holes 705.

As shown in FIG. 7 and FIG. 8A, the first heat exchange tube set 701 is provided with the heat exchange tube exhaust channel 729, which extends obliquely upward from the two sides of the lower part 742 of the first heat exchange tube set and toward the central interface of the first heat exchange tube set 701 in the width direction. On a section plane perpendicular to the length direction of the cavity 305, the width of the heat exchange tube exhaust channel 729 is greater than the gap between the heat exchange tubes above the heat exchange tube exhaust channel 729. In one embodiment of the present application, the heat exchange tube exhaust channel 729 is formed by vacating a position of several heat exchange tubes along the extending direction of the heat exchange tube exhaust channel 729, and thus the width of the heat exchange tube exhaust channel 729 is slightly greater than the diameter of the heat exchange tube. The gaseous refrigerant generated in the first heat exchange tube set 701 can enter the baffle exhaust channel 708 through the heat exchange tube exhaust channel 729.

The heat exchange tube exhaust channel 729 and the baffle exhaust channel 708 are beneficial to the rapid discharge of the gaseous refrigerant to the circulation space 760, so as to prevent excessive gaseous refrigerant entering the second heat exchange tube set 702 to impact a refrigerant liquid film on the second heat exchange tube set 702 and affect the heat exchange efficiency of the second heat exchange tube set 702. Meanwhile, the vibration generated by the impact of the gaseous refrigerant on the second heat exchange tube set 702 is reduced.

Figure 9A:
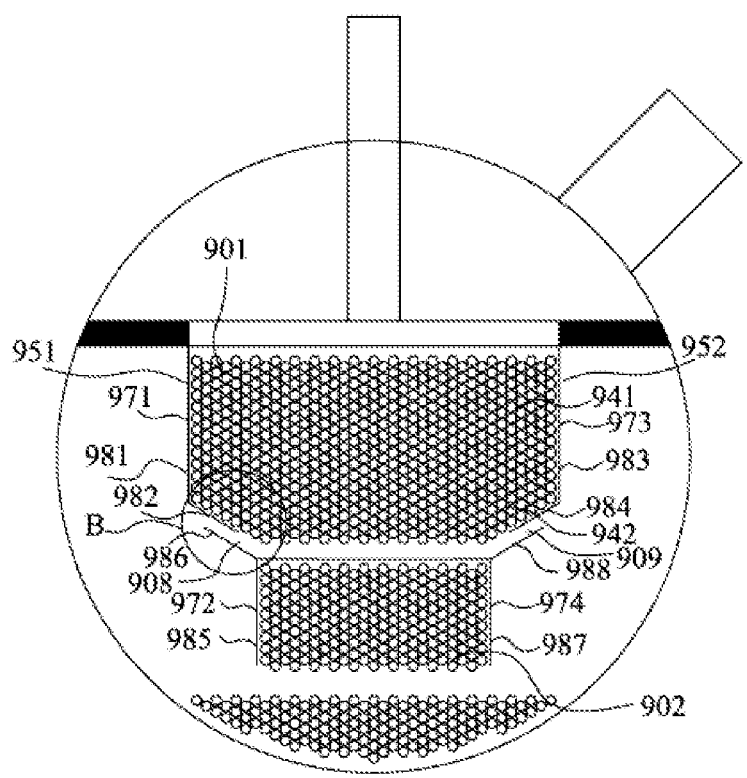
FIG. 9A is a schematic diagram of a radial section of a third embodiment of the evaporator in the present application.
Figure 9B:
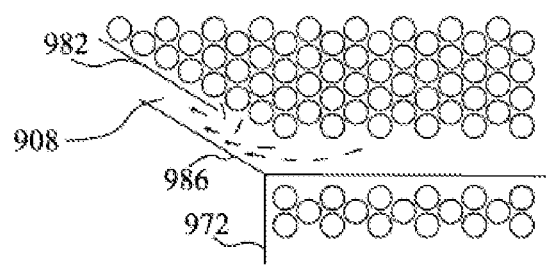
FIG. 9B is a partially enlarged view of a part B in FIG. 8A.

FIG. 9A is a schematic diagram of a radial section of a third embodiment of the evaporator in the present application and FIG. 9B is a partially enlarged view of a part B in FIG. 9A. The embodiment is similar to the embodiment shown in FIG. 7, except for the arrangement mode of the baffle exhaust channel.

As shown in FIG. 9A and FIG. 9B, the first side heat exchange tube baffle device 951 comprises a first side upper baffle 971 and a first side lower baffle 972, and the second side heat exchange tube baffle device 952 comprises a second side upper baffle 973 and a second side lower baffle 974. The first side upper baffle 971 comprises an upper section 981 and a lower section 982, and the second side upper baffle 973 comprises an upper section 983 and a lower section 984. The upper sections 981 and 983 are disposed on two sides of the upper part 941 of the first heat exchange tube set, and the lower sections 982 and 984 are disposed on two sides of the lower part 942 of the first heat exchange tube set. The first side lower baffle 972 comprises a main body section 985 and an extension section 986, and the lower baffle 974 comprises a main body section 987 and an extension section 988. The main body sections 985 and 987 are disposed on two sides of the second heat exchange tube set 902, and the extension sections 986 and 988 extend upward and outward from the tops of the main body section 985 and 987, respectively, along directions substantially parallel to the lower section 982 and 984 respectively. The extension sections 986 and 988 exceed the bottoms of the lower sections 982 and 984 in the height direction of the cavity 305 to be at least partially overlapped with the first side upper baffle 971 and the second side upper baffle 973. The extension section 986 has a certain distance from the lower section 982 of the first side upper baffle 971 to form an exhaust channel 908, and the extension section 988 has a certain distance from the lower section 984 of the second side upper baffle 973 to form an exhaust channel 909. The gaseous refrigerant generated in the first heat exchange tube set 901 can be discharged through the exhaust channel 908 and the exhaust channel 909. Compared with the embodiment shown in FIG. 7, it is not easy for the liquid refrigerant in the present embodiment to flow out from the exhaust channels 908 and 909.

Figure 10A:
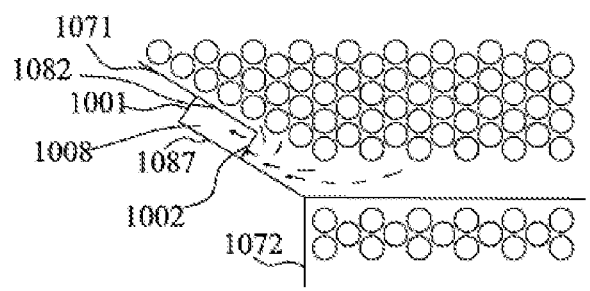
FIG. 10A is a partially enlarged view of a radial sectional view of a fourth embodiment of the evaporator in the present application.
Figure 10B:
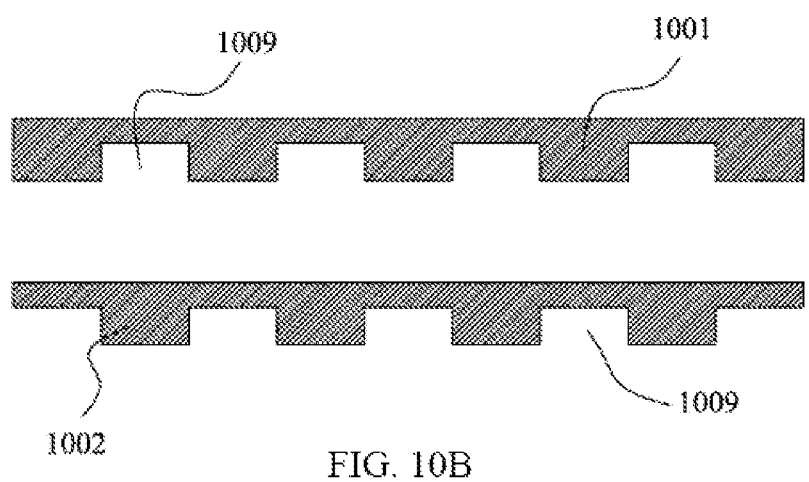
FIG. 10B is a top view of the transverse baffle in FIG. 10A.

FIG. 10A is a partially enlarged view of a radial sectional view of a fourth embodiment of the evaporator in the present application and FIG. 10B is a top view of the transverse baffle in FIG. 10A. The embodiment is similar to the embodiment shown in FIG. 9A, except that the baffle exhaust channel in FIG. 10A further comprises a transverse baffle.

As shown in FIG. 10A and FIG. 10B, an exhaust channel 1008 is formed between the extension section 1087 of the lower baffle 1072 and the lower section 1082 of the upper baffle 1071, and transverse baffles 1001 and 1002 are provided in the exhaust channel 1008. The transverse baffles 1001 and 1002 extend transversely to the extension section 1087 of the lower baffle 1072, that is to say, the transverse baffles 1001 and 1002 are perpendicular to the extension section 1087 of the lower baffle 1072, or form certain included angles with the extension section 1087 of the lower baffle 1072. As shown in FIG. 10B, the transverse baffles 1001 and 1002 are provided with a plurality of openings 1009, and the openings 1009 can allow the gaseous refrigerant to pass through. The openings 1009 may be holes penetrating through the transverse baffles 1001 and 1002, or recesses formed by inwardly indenting from one side edge of the transverse baffles 1001 and 1002. Among them, the openings 1009 of the transverse baffles 1001 and the openings 1009 of the transverse baffles 1002 are arranged in a staggered manner, so that the gaseous refrigerant can pass through smoothly, while most of the liquid refrigerant can be blocked by the transverse baffles 1001 and 1002. Compared with the embodiment shown in FIG. 9A, the present embodiment can further prevent the liquid refrigerant from flowing out from the baffle exhaust channel.

Figure 11:
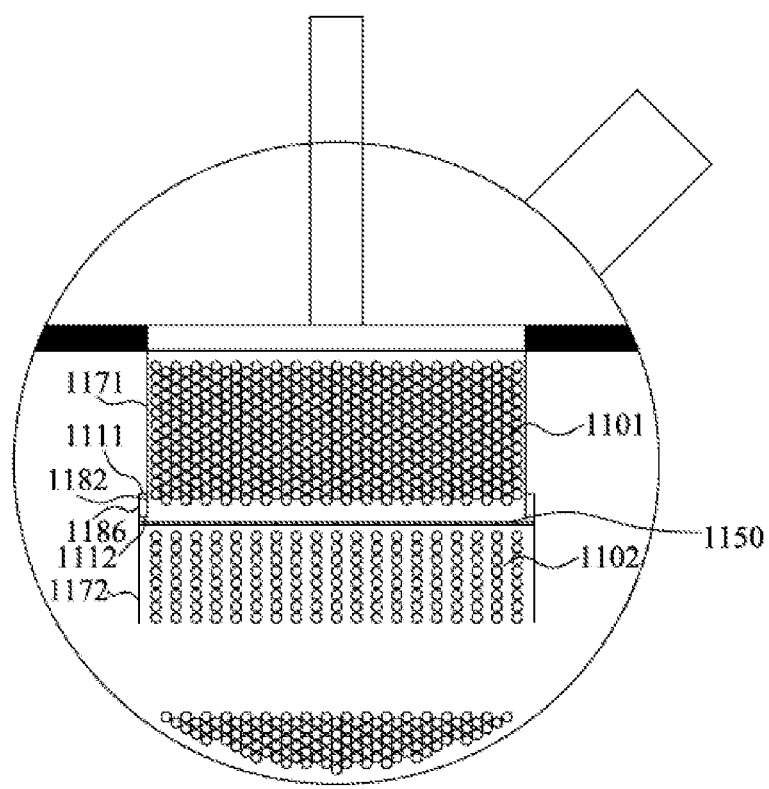
FIG. 11 is a schematic diagram of a radial section of a fifth embodiment of the evaporator in the present application.

FIG. 11 is a schematic diagram of a radial section of a fifth embodiment of the evaporator in the present application, which is similar to the embodiment shown in FIG. 3, except that the width of the first heat exchange tube set 1101 is identical to that of the second heat exchange tube set 1102. As shown in FIG. 11, the first heat exchange tube set 1101 and the second heat exchange tube set 1102 have uniform widths, respectively, and the second heat exchange tube set 1102 is disposed at the lower part of the first heat exchange tube set 1101. The width of the first heat exchange tube set 1101 is basically identical to that of the second heat exchange tube set 1102. However, the number of columns of the first heat exchange tube set 1101 is less than that of the second heat exchange tube set 1102, that is to say, in the width direction of the cavity 305, the heat exchange tubes in the first heat exchange tube set 1101 are arranged more densely than those in the second heat exchange tube set 1102. The number of rows and positions of the holes in the redistribution device 1150 correspond to the second heat exchange tube set 1102, and the liquid refrigerant can also be evenly distributed into the second heat exchange tube set 1102, thereby achieving the technical effect of the embodiment shown in FIG. 3

In the embodiment shown in FIG. 11, the upper baffle 1171 and the lower baffle 1172 both extend along a vertical direction, the lower section 1182 of the upper baffle 1171 is partially overlapped the extension section 1186 of the lower baffle 1172 in the height direction of the cavity 305, and transverse baffles 1111 and 1112 are disposed between baffle exhaust channels 1108, which can also achieve the technical effect as shown in the embodiment of FIG. 10A.

In the above embodiments of the present application, the falling film heat exchange tube set, the first side heat exchange tube baffle device and the second side heat exchange tube baffle device are all symmetrical with respect to the central interface of the cavity in the width direction. In other embodiments, the falling film heat exchange tube set, the first side heat exchange tube baffle device and the second side heat exchange tube baffle device may also be asymmetrical with respect to the central interface of the cavity in the width direction, as long as the number of columns of the first heat exchange tube set in the falling film heat exchange tube set is greater than that of the second heat exchange tube set. For example, in the width direction of the cavity, a first side of the second heat exchange tube set is flush with that of the first heat exchange tube set, and a second side of the second heat exchange tube set is staggered from that of the first heat exchange tube set.

In the falling film evaporator, the refrigerant liquid entering the evaporator from the refrigerant inlet is distributed by the main distribution device before being evenly distributed to the surfaces of the heat exchange tubes at the top of the falling film heat exchange tube set to form a liquid film for heat exchange. A part of the liquid refrigerant is converted into a gaseous state after evaporation and heat exchange, and the other part of the non-evaporated liquid refrigerant will drop onto the lower row of heat exchange tubes and continue to evaporate; the flow of the liquid refrigerant flowing through the falling film heat exchange tube set gradually decreases from the top to the bottom of the falling film heat exchange tube set.

Generally, the relationship between a falling film evaporation heat exchange coefficient "$h_r$" and the flow "$m_1$" of the liquid refrigerant flowing through the falling film heat exchange tube is as follows: when the flow of the liquid refrigerant is greater than a critical flow "$m_2$", the falling film evaporation heat exchange coefficient "$h_r$" basically does not change with the change of the flow of the liquid refrigerant, and when the flow of the liquid refrigerant is less than the critical flow "$m_2$", the falling film evaporation heat exchange coefficient "$h_r$" decays rapidly as the flow of the liquid refrigerant decreases. In the design of the falling film evaporator, in order to prevent the decay of the falling film heat exchange coefficient, the flow of the liquid refrigerant at the heat exchange tube at the bottom of the falling film heat exchange tube set is guaranteed to reach the critical flow "$m_2$". Also, a certain ratio flooded heat exchange tube bundles is disposed at the bottom of the evaporator to exchange heat for the liquid refrigerant at the bottom of the falling film heat exchange tube set.

In order to ensure the heat exchange performance of the flooded heat exchange tube set area, the refrigerant needs to submerge the flooded heat exchange tube set. In general design, the number of columns of the falling film heat exchange tubes is uniform, in which design, usually when the ratio of the heat exchange tubes in the falling film heat exchange tube set to the heat exchange tubes in the flooded heat exchange tube set is 1:1, the heat exchange efficiency of the entire evaporator is higher.

In the evaporator of the present application, the falling film heat exchange tube set comprises two parts with different numbers of columns; after the first heat exchange tube set exchanges heat with the liquid refrigerant, a part of the liquid refrigerant is converted into gas and the flow of the liquid refrigerant at the heat exchange tube gradually decreases from top to bottom. The flow of the liquid refrigerant of the heat exchange tubes at the bottom of the first heat exchange tube set has reached the critical flow "$m_2$". In this case, if heat exchange tubes of the same number of columns are continuously added at the bottom of the first heat exchange tube set, the flow of the liquid refrigerant at the added heat exchange tubes is less than the critical flow "$m_2$", which will result in the decrease of the falling film evaporation heat exchange coefficient "$h_r$" of the added heat exchange tubes, thereby affecting the heat exchange efficiency of the evaporator. Therefore, in the present application, a redistribution device and a second heat exchange tube set with fewer columns are added for the liquid refrigerant at the bottom of the first heat exchange tube set to continue heat exchange. The redistribution device collects and then redistributes the liquid refrigerant at the bottom of the first heat exchange tube set and the number of rows of holes in the redistribution device corresponds to the number of columns of the second heat exchange tube set. Since the number of columns of the second heat exchange tube set is less than that of the first heat exchange tube set, the flow of the liquid refrigerant of the heat exchange tubes at the top of the second heat exchange tube set will be greater than that of the heat exchange tubes at the bottom of the first heat exchange tube set, that is to say, the flow of the liquid refrigerant of the heat exchange tubes at the top of the second heat exchange tube set exceeds the critical flow "$m_2$", the second heat exchange tube set can maintain a higher falling film evaporation heat exchange coefficient "$h_r$", and thus the second heat exchange tube set can also maintain a higher heat exchange efficiency.

In the falling film evaporator, the flooded heat exchange tube set is used to exchange heat for the refrigerant that has not been vaporized after heat exchange by the falling film heat exchange tube set, but the heat exchange tubes of the flooded heat exchange tube set are submerged in the refrigerant liquid, and when the liquid flow of the heat exchange tubes in the falling film heat exchange tube set is greater than the critical flow $m_2$, the heat exchange coefficient of the heat exchange tubes in the flooded heat exchange tube set is smaller than that of the heat exchange tubes in the falling film heat exchange tube set. Therefore, on the premise of meeting the above flow requirements for the falling film heat exchange tubes, increasing the ratio of the number of heat exchange tubes in the falling film heat exchange tube set to the total number of heat exchange tubes in the evaporator is beneficial to improving the heat exchange efficiency of the evaporator.

In the present application, by disposing the falling film heat exchange tube set to comprise two parts with different numbers of columns, and disposing the redistribution device at the same time, when the flow of the heat exchange tubes at the bottom of the first heat exchange tube set has reached the critical flow, the refrigerant can be redistributed by the redistribution device, thereby increasing the flow of the liquid refrigerant at each column of heat exchange tubes in the second heat exchange tube set, and achieving that the flow of the liquid refrigerant in the heat exchange tubes of the second heat exchange tube set is greater than or equal to the critical flow "$m_2$". At the bottom of the second heat exchange tube set, the flow at each heat exchange tube is close to or equal to the critical flow. Since the heat exchange tubes at the bottom of the falling film heat exchange tube set are generally disposed to reach the critical flow, compared with a traditional evaporator, the evaporator in the present application has fewer columns of heat exchange tubes in the second heat exchange tube set, and the total amount of the liquid refrigerant at the bottom of the second heat exchange tube set is less, thereby reducing the number of heat exchange tubes required in the flooded heat exchange tube set. Compared with a traditional falling film evaporator, the ratio of the number of heat exchange tubes to the total number of heat exchange tubes is larger in the falling film heat exchange tube set in the present application, so the evaporator in the present application has higher heat exchange efficiency.

While only some of the features of the present application are illustrated and described herein, various modifications and changes can be made to those skilled in the art. It is therefore to be understood that the appended claims are intended to cover all the above modifications and changes that fall within the true spirit of the present application.

The invention claimed is:

1. An evaporator, comprising:
a housing, wherein the housing has a cavity, and the cavity has a length direction, a width direction, and a height direction;
a first heat exchange tube set and a second heat exchange tube set, wherein heat exchange tubes in the first heat exchange tube set and the second heat exchange tube set extend along the length direction of the cavity, and are arranged along the width direction and the height direction of the cavity, and the first heat exchange tube set is located above the second heat exchange tube set, wherein in the width direction of the cavity, a first number of columns of the first heat exchange tube set is greater than a second number of columns of the second heat exchange tube set;
a first side heat exchange tube baffle device and a second side heat exchange tube baffle device, wherein the first side heat exchange tube baffle device and the second side heat exchange tube baffle device are disposed on opposite sides of the first heat exchange tube set and the second heat exchange tube set in the width direction of the cavity, respectively, and are arranged along outer contours of the first heat exchange tube set and the second heat exchange tube set; and
a redistribution device, wherein the redistribution device is disposed between the first heat exchange tube set and the second heat exchange tube set, and two ends of the redistribution device in the width direction of the cavity are connected to the first side heat exchange tube baffle device and the second side heat exchange tube baffle device, respectively, wherein the redistribution device extends along the length direction of the cavity to cover a top of the second heat exchange tube set, and is a distance from a lower part of the first heat exchange tube set, the redistribution device is provided with a plurality of rows of holes, each row of holes of the plurality of rows of holes is arranged along an extending direction of the heat exchange tubes, and each row of holes of the plurality of rows of holes is aligned with a corresponding column of heat exchange tubes in the second heat exchange tube set.

2. The evaporator according to claim 1, wherein:
the first heat exchange tube set and the second heat exchange tube set are arranged symmetrically with respect to a central interface of the cavity extending along the height direction, respectively.

3. The evaporator according to claim 2, wherein:
a width of the first heat exchange tube set is identical to that of the second heat exchange tube set.

4. The evaporator according to claim 3, wherein:
the first heat exchange tube set has an upper part of the first heat exchange tube set and a lower part of the first heat exchange tube set, and in the width direction of the cavity, a width of the upper part of the first heat exchange tube set is greater than the width of the second heat exchange tube set.

5. The evaporator according to claim 4, wherein:
a width of the lower part of the first heat exchange tube set gradually decreases from top to bottom, a width of the top of the lower part of the first heat exchange tube set is identical to the width of the upper part of the first heat exchange tube set, and a width of the bottom of the lower part of the first heat exchange tube set is identical to the width of the second heat exchange tube set.

6. The evaporator according to claim 4, wherein:
in the width direction of the cavity, sizes of a plurality of holes in the redistribution device gradually decrease from a middle to two sides of the redistribution device.

7. The evaporator according to claim 1, further comprising:
a third heat exchange tube set, wherein the third heat exchange tube set is located at a bottom of the cavity and below the second heat exchange tube set, and the third heat exchange tube set is positioned apart from the second heat exchange tube set to form a circulation space, so that a gaseous refrigerant flowing out from the second heat exchange tube set can flow to a refrigerant outlet disposed on the housing through the circulation space.

8. The evaporator according to claim 1, wherein:
the first side heat exchange tube baffle device and the second side heat exchange tube baffle device comprise at least one baffle exhaust channel, respectively, in the height direction of the cavity, the at least one baffle exhaust channel is located above the second heat exchange tube set, and the at least one baffle exhaust channel is configured to discharge a gaseous refrigerant in the first heat exchange tube set.

9. The evaporator according to claim 8, wherein:
the first side heat exchange tube baffle device and the second side heat exchange tube baffle device comprise a lower section of a first side upper baffle and a lower section of a second side upper baffle, respectively, the lower section of the first side upper baffle and the lower section of the second side upper baffle are disposed on two sides of the lower part of the first heat exchange tube set, the lower section of the first side upper baffle and the lower section of the second side upper baffle are provided with a plurality of exhaust holes, respectively, and each of the plurality of exhaust holes forms the at least one baffle exhaust channel,
the plurality of exhaust holes are arranged along the length direction of the cavity, and each of the plurality of exhaust holes forms a long strip shape in a direction from an upper part of the first heat exchange tube set to the second heat exchange tube set.

10. The evaporator according to claim 9, wherein:
the first heat exchange tube set has a heat exchange tube exhaust channel, the heat exchange tube exhaust channel is formed between the heat exchange tubes of the first heat exchange tube set, the heat exchange tube exhaust channel extends inward and upward from the two sides of the lower part of the first heat exchange tube set, and on a section plane perpendicular to the length direction of the cavity, a width of the heat exchange tube exhaust channel is greater than a gap between the heat exchange tubes above the heat exchange tube exhaust channel.

11. The evaporator according to claim 10, comprising:

an upper baffle and a lower baffle, the upper baffle disposed on one side of the first heat exchange tube set, the lower baffle comprises a main body section and an extension section, the main body section is disposed on one side of the second heat exchange tube set, the extension section extends upward from the main body section, the extension section is at least partially overlapped with the upper baffle, and the baffle exhaust channel is formed between the upper baffle and the extension section.

12. The evaporator according to claim 11, wherein:

each of the first side heat exchange tube baffle device and the second side heat exchange tube baffle device further comprises at least one transverse baffle, the at least one transverse baffle is disposed in the baffle exhaust channel, the at least one transverse baffle extends transversely to the extension section of the lower baffle, and the at least one transverse baffle is provided with a plurality of openings to allow the gaseous refrigerant to pass through.

13. The evaporator according to claim 12, wherein:

the at least one transverse baffle comprises two transverse baffles, the at least one transverse baffle is arranged along an extending direction of the baffle exhaust channel, and openings in the two transverse baffles are arranged in a staggered manner.

* * * * *